United States Patent [19]

Mott

[11] 4,375,253
[45] Mar. 1, 1983

[54] DEFLECTION LIMITING STOP FOR A DIAPHRAGM SPRING CLUTCH

[75] Inventor: Philip J. Mott, Harwood Heights, Ill.

[73] Assignee: Borg-Warner Corporation, Chicago, Ill.

[21] Appl. No.: 190,131

[22] Filed: Sep. 24, 1980

[51] Int. Cl.³ ................ F16D 13/44; F16D 13/71
[52] U.S. Cl. ................................................. 192/89 B
[58] Field of Search ............. 192/89 B, 109 R, 99 S, 192/99 A, 70.28

[56] References Cited

U.S. PATENT DOCUMENTS

| | | |
|---|---|---|
| 3,213,991 | 10/1965 | Smirl et al. . |
| 3,323,624 | 6/1967 | Maurice . |
| 3,385,409 | 5/1968 | Smirl . |
| 3,489,256 | 1/1970 | Binder et al. ...................... 192/98 |
| 3,712,435 | 1/1973 | Kraus ................................ 192/89 B |
| 3,773,155 | 11/1973 | Fujita et al. . |
| 3,785,466 | 1/1974 | Murai et al. . |
| 4,095,683 | 6/1978 | Ban . |
| 4,238,018 | 12/1980 | Maucher ........................ 192/89 B |

Primary Examiner—George H. Krizmanich
Attorney, Agent, or Firm—James A. Geppert

[57] ABSTRACT

A deflection limiting stop for a diaphragm spring clutch which is positioned in the clutch cover to be engaged by the outer periphery of the diaphragm spring as it pivots from the engaged to the disengaged position of the clutch. The use of the stop prevents an overstressed condition for the spring, and thus improves the fatigue life thereof.

4 Claims, 4 Drawing Figures

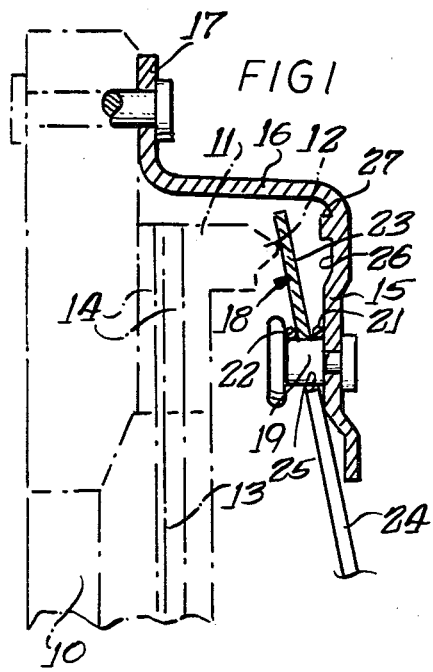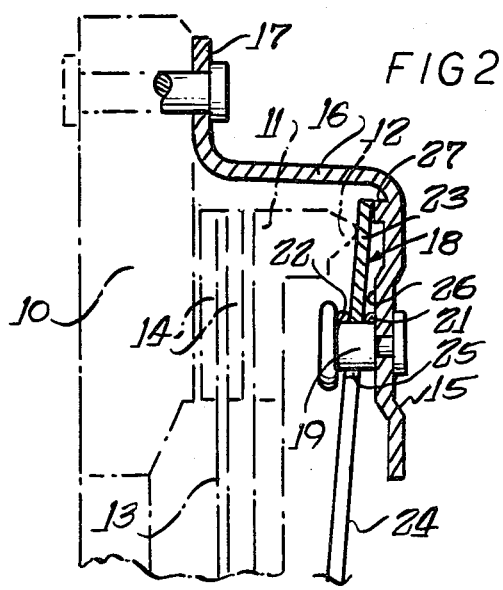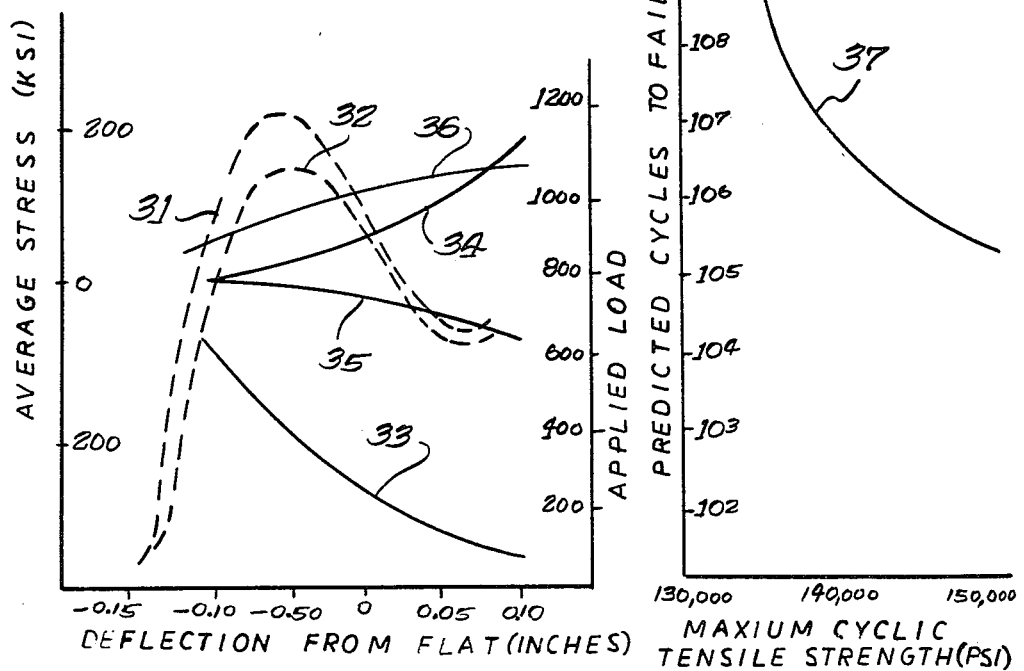

DEFLECTION LIMITING STOP FOR A DIAPHRAGM SPRING CLUTCH

BACKGROUND OF THE INVENTION

A conventional diaphragm spring-type clutch assembly for an automotive vehicle includes an engine driven flywheel, a clutch cover secured to the flywheel, an axially reciprocable pressure plate rotatable with the cover and flywheel, a clutch driven plate assembly mounted on the transmission input shaft extending into the clutch cover and having friction surfaces located between engaging surfaces of the flywheel and pressure plate, a diaphragm spring pivotally mounted on the clutch cover and engaging a pressure plate fulcrum surface adjacent the spring periphery, and an axially reciprocable release bearing movable on the transmission input shaft and engaging the inner ends of spring fingers formed on the inner portion of the diaphragm spring.

Inward movement of the release bearing due to the vehicle operator depressing the clutch pedal causes the bearing to engage the spring fingers and pivot the diaphragm spring about the privotal mounting means secured in the clutch cover to release the pressure plate. Release of the clutch pedal causes the diaphragm spring to pivot in the opposite direction to engage the pressure plate and urge it against the clutch plate, thus squeezing the clutch plate between the flywheel and pressure plate to engage the clutch. As the clutch is engaged and disengaged numerous times during operation of the vehicle, the diaphragm spring is stressed by the cyclical pivotal movement thereof during each clutch engagement and disengagement. Work has been performed studying the cyclical stress encountered by the diaphragm spring and efforts have been made to reduce the maximum stress.

Photoelastic tests performed on a diaphragm spring show that the tensile and compressive stress is extremely high at and beyond the valley load of a typical deflection rate curve for a diaphragm or Belleville spring. These high stresses can cause a reduction of the effective life of the spring, and it was found that a small reduction in maximum cyclic stress can result in large gains in the spring fatigue life. The present invention provides an effective way of reducing the maximum cyclic stress of a diaphragm spring in a vehicle clutch.

SUMMARY OF THE INVENTION

The present invention comprehends the provision of a novel means to reduce the maximum cyclic stress in a diaphragm spring utilized in an automotive vehicle clutch assembly, which comprises a limiting stop affixed in the clutch cover to be contacted by the outer edge of the diaphragm spring during pivotal spring movement for clutch disengagement. This stop prohibits the spring from being inadvertently deflected into a range of damaging stress and restricts the operating range of the spring to a safe portion of the spring deflection curve. If an attempt is made to load the spring after it has engaged the stop, any further deflection would occur by bending of the lower stressed spring fingers.

The present invention also comprehends the provision of a spring deflection stop that enhances the fatigue life of the spring. Thus, the effective life of the clutch assembly will be extended.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a partial cross sectional view of the diaphragm spring and clutch cover of the present invention with the clutch in engaged position.

FIG. 2 is a cross sectional view similar to FIG. 1, but showing the diaphragm spring position when the clutch is disengaged.

FIG. 3 is a graph showing the stress on the spring as the spring deflects.

FIG. 4 is a graph showing fatigue life of the spring for maximum cyclic tensile stress.

DESCRIPTION OF THE PREFERRED EMBODIMENTS

Referring more particularly to the disclosure in the drawing wherein is shown an illustrative embodiment of the present invention, FIG. 1 discloses a partial view of a vehicle clutch assembly including a flywheel 10, an axially reciprocable pressure plate 11 having a rearwardly extending fulcrum surface or edge 12, a clutch plate 13 with opposite friction facings 14,14 a clutch cover 15 having a side wall 16 terminating in a flange 17 secured to the flywheel 10, and a diaphragm or Belleville spring 18 located within the clutch cover. A plurality of shouldered rivets 19 are secured in the clutch cover in a circumferentially spaced circle and support a pair of wire hoops 21 and 22.

The diaphragm spring 18 has a generally conical body 23 engaging the fulcrum surface 13 adjacent its periphery, with a plurality of inwardly extending spring fingers 24 separated by radial slots terminating in enlarged openings 25; the shouldered rivets 19 extending through several of the openings 25 with the wire hoops 21 and 22 supported on the rivets on opposite surfaces of the spring 18 to provide pivoting surfaces for the spring. Mounted on the interior surface 26 of the clutch cover are one or more deflection limiting stops 27. The stops can be in the form of an annular ring or several circumferentially spaced individual stops; the stop or stops either being formed integral with the cover or as separate members suitably secured to the cover.

To disengage the vehicle clutch, the operator depresses the clutch pedal which actuates a release bearing (not shown) to engage the inner ends of the spring fingers 24, in their position of FIG. 1, and move the fingers toward the flywheel 10 so that the diaphragm spring 18 pivots on the hoop 21 to an overcenter position as shown in FIG. 2. Without the limiting stop 27, the spring could be inadvertently deflected into a range of damaging stress; however, the stop restricts the operating range of the spring to a safe section of the spring curve. If it is attempted to load the spring after it contact the stop, any further deflections would be caused by bending of the lower stressed fingers 24. To engage the clutch, movement of the release bearing is reversed so that the spring will now pivot about the hoop 22 to engage the pressure plate 11 and urge it toward the clutch plate 13 and flywheel 10.

FIG. 3 is a graph of the results of photoelastic tests performed on a diaphragm spring to show the stresses in the spring versus spring deflection from a flat position. The dotted line curves 31 and 32 show deflection rate of a diaphragm spring. The curves 33, 34, 35 and 36 show the tensile and compressive stresses in the spring as the spring passes over-center through a flat position. Of the curves, line 33 shows the stress at the convex side of an opening 25, while curve 34 is the same but for the concave side of an opening 25. Curve 35 is the stress at the convex side of the spring edge, while curve 36 is the same for the concave spring side. FIG. 4 illustrates calculations predicting the fatigue life based on maximum cycle tensile stress. The results of the curve 37 of FIG. 4 show that a small reduction in maximum cyclic stress can result in large gains for fatigue life.

I claim:

1. In a vehicle clutch assembly including a flywheel, a clutch cover secured to the flywheel, a pressure plate operatively connected with said clutch cover and having a fulcrum surface formed adjacent its outer periphery, a clutch plate positioned between and adapted to be squeezed by the flywheel and pressure plate, and a diaphragm spring pivotally mounted intermediate its inner and outer edges in said clutch cover and engaging said fulcrum surface on said pressure plate radially outwardly of said clutch cover pivotal mounting, the outer edge of said spring having freedom of movement within said clutch cover, the improvement comprising at least one deflection limiting stop secured in said clutch cover to be engaged by said outer spring edge and limit pivotal movement of said diaphragm spring.

2. A vehicle clutch assembly as set forth in claim 1, in which said limiting stop is located on the interior surface of said clutch cover so as to engage the periphery of said diaphragm spring.

3. A vehicle clutch assembly as set forth in claim 1, in which an annular limiting stop is secured to said clutch cover.

4. A vehicle clutch assembly as set forth in claim 2, in which said limiting stop is integral with said clutch cover.

* * * * *